United States Patent Office 2,856,356
Patented Oct. 14, 1958

2,856,356

PREPARATION OF A DRILLING FLUID COMPOSITION AND METHOD OF USE

Walter J. Weiss, Sugar Land, and Wilbur L. Hall, Bellaire, Tex., assignors to The Texas Company, New York, N. Y., a corporation of Delaware No Drawing. Application July 25, 1956
Serial No. 599,904

15 Claims. (Cl. 252—8.5)

This invention relates to the drilling of wells through subsurface formations by means of well drilling tools. More particularly, this invention relates to a drilling operation, such as a rotary drilling operation, which involves circulation of a drilling fluid through the well bore and about the drilling bit. In a rotary drilling operation a stream of drilling fluid is continuously pumped down the drill stem to the drilling bit at the bottom of the bore hole. The stream of drilling fluid passes through or about the drilling bit and moves upwardly through the annular space between the drill stem and the well bore wall carrying with it the drilling cuttings.

In some areas, such as in the area of the Gulf Coast of Texas and Louisiana, subsurface formations known as heaving or sloughing shales are penetrated during a well drilling operation. The penetration of these formations while employing conventional aqueous or water-base drilling fluids has been difficult due to the mud-making characteristics or properties of heaving shales. These shales have a tendency to disintegrate by swelling or cracking upon contact with water with the result that the walls of the bore hole become unstable or incompetent and the heaving shale material making up the walls of the bore hole becomes unstable and sloughs into the bore hole. In some instances the sloughing or moving of this heaving shale material into the bore hole results in a stuck drill pipe. In other instances the heaving shale material swells and sloughs or caves into the bore hole with a resulting enlargement of the bore hole or the formation of a large subterranean cavity.

In addition to the above-indicated difficulties of maintaining a true bore hole when drilling through heaving shale material with a conventional water-base drilling fluid, the resulting finely dispersed heaving shale material taken up into the drilling fluid adversely affects the viscosity characteristics of the drilling fluid because of the mud-making properties of the heaving shale. Upon continued accumulation of the dispersed finely divided heaving shale particles in the drilling fluid the viscosity of the drilling fluid increases with the result that the drilling fluid must be thinned by the addition of costly chemicals thereto or by dilution with water. If the drililng fluid is thinned by water dilution the addition of more weighting material, such as barium sulphate (barytes), iron oxide, lead sulphide (galena) and the like is necessary in order to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for use during a drilling operation while drilling through less seriously dispersing or heaving shale formations is a high pH, lime-base drilling fluid which contains lime together with quebracho, caustic soda, water, and the conventional hydratable type of drilling clay. High pH, lime-base drilling fluids, however, cannot be employed without considerable difficulty while drilling through the more seriously heaving shale formations. Additionally, a high pH, lime-base drilling fluid is sensitive to salt or calcium contamination, such as contamination by calcium chloride or calcium sulphate, which leads to clay flocculation with a resulting increase in viscosity and water loss. Although in some instances the desirable viscosity, mud weight and water loss properties of a high pH, lime-base drilling mud can be maintained while drilling through a heaving shale formation by the addition of suitable chemicals, such as the addition of caustic soda and quebracho and the like, the continued addition of these chemicals to the drilling fluid involves considerable expense.

Accordingly it is an object of this invention to provide an improved drilling fluid suitable for drilling through troublesome shale formations of the heaving, sloughing or rapidly dispersing type.

It is another object of this invention to provide a reagent material suitable for the preparation and/or maintenance of a drilling fluid useful for drilling through troublesome shale formations of the heaving, sloughing or rapidly dispersing type.

It is another object of this invention to provide a drilling fluid which is capable of being more readily maintained at a given density while being employed as a drilling fluid during drilling through heaving or sloughing shale formations.

It is another object of this invention to provide a drilling fluid which is relatively insensitive to salt (NaCl) contamination and to magnesium or calcium ion contamination, such as may arise while drilling through a gypsum bed or upon encountering a high pressure salt water flow.

It is another object of this invention to provide a composition suitable for the preparation of an aqueous drilling fluid which readily converts heaving shale material exposed in the well bore into a more stable, competent material.

Yet another object of this invention is to provide a drilling fluid reagent material or admixture suitable for the preparation of an alkaline aqueous drilling fluid characterized by a relatively high dissolved magnesium or magnesium ion content.

These and other objects of this invention and how they are accomplished will become more apparent in the light of the accompanying disclosure. In at least one embodiment of this invention at least one of the foregoing objects will be achieved.

In accordance with this invention we have provided a drilling fluid particularly suitable for drilling through a heaving shale formation, said drilling fluid being characterized by an alkaline aqueous phase having a relatively high dissolved magnesium or magnesium ion content sufficient to stabilize, harden or otherwise control or inhibit the mud-making properties of heaving shale material or clays in contact with the drilling fluid. More particularly, we have provided an improved alkaline water-base drilling fluid comprising water, finely dispersed or colloidal hydratable or hydrated drilling clay material together with a suitable dispersing agent for the clay material, said water containing a relatively high dissolved or solubilized magnesium or magnesium-containing ion content. Still in accordance with this invention we have provided a drilling fluid reagent admixture suitable for the preparation of such a drilling fluid or suitable for the preparation of the alkaline aqueous phase thereof.

A drilling fluid in accordance with the practice of our invention may be prepared in the first instance by the addition of the drilling fluid reagent material to a water admixture of hydratable clayey material together with the usual, conventional drilling mud additives (water loss additive, weighting material, emulsifying agent and the like), if desired; or a conventional water containing drilling fluid may be converted (broken over) to a drilling fluid in accordance with our invention by the addition of the reagent admixture.

A characteristic of a drilling fluid (which may be a water-base fluid or an oil-in-water emulsion fluid) prepared in accordance with the practice of this invention is the presence therein of an alkaline aqueous phase containing a substantial amount, at least about 400 parts per million (p. p. m.) by weight, preferably in the range 600–1500 p. p. m. or higher, of dissolved magnesium or magnesium ion either as the magnesium ion, per se, or as a magnesium-containing ion. The aqueous phase of a drilling fluid prepared in accordance with this invention is alkaline due to the presence therein of magnesium hydroxide added directly to the drilling fluid either as magnesium hydroxide or as hydratable magnesium oxide, or created or otherwise generated in situ by metathetical reaction between a water-soluble magnesium compound, such as a magnesium salt, and a water-soluble basic ammonium compound such as ammonium hydroxide. In any event, it is a characteristic of the alkaline aqueous phase of the drilling fluid of this invention that it is saturated with respect to magnesium hydroxide and in addition contains dissolved magnesium to an extent higher than that attributable to the normal solubility of magnesium hydroxide alone in water. This high dissolved magnesium ion content may be achieved through the use of hydratable magnesium oxide and magnesium hydroxide alone without the addition of an extraneous water-soluble magnesium compound, such as a magnesium salt, by the addition to the aqueous phase of a water-soluble magnesium hydroxide solubilizing agent, preferably a solubilizing agent which generates or yields an ammonium ion in aqueous solution, such as by the addition to the aqueous phase of an ammonium compound such as a water soluble ammonium salt such as ammonium sulphate, ammonium chloride and the like, which solubilizes the normally substantially water-insoluble magnesium hydroxide to a water-soluble form by complex ion formation or by some other mechanism.

The aqueous phase (filtrate) has a pH not greater than about 10.5 which value corresponds to the pH of a saturated aqueous solution of magnesium hydroxide. Usually the aqueous phase has a pH in the range 8.5–10.2.

In accordance with one embodiment of the practice of this invention the alkaline aqueous phase is substantially saturated with respect to magnesium hydroxide and contains dissolved magnesium or magnesium hydroxide solubilized therein by means of a water-soluble ammonium salt, e. g., ammonium nitrate, ammonium chloride, ammonium sulphate, ammonium acetate and the like. In accordance with yet another embodiment of the practice of this invention the alkaline aqueous phase contains a dissolved water-soluble magnesium salt, such as magnesium sulphate, magnesium chloride and the like, together with an added water soluble ammonium base, such as ammonium hydroxide together with, if desired, an added water soluble ammonium salt, such as ammonium chloride, ammonium sulphate and the like, in suitable proportions to obtain the desired alkalinity and magnesium hydroxide and magnesium ion concentration in the aqueous phase.

Suitable water-soluble magnesium compounds, all of which possess a solubility in water greater than the solubility of magnesium hydroxide and which have a solubility of at least 5 parts per hundred parts by weight in cold water, are magnesium acetate, magnesium ammonium chloride, magnesium ammonium sulphate, magnesium bromide, magnesium citrate, magnesium formate, magnesium ferrocyanide, magnesium hypophosphite, magnesium iodide, magnesium nitrate, magnesium potassium chloride, magnesium potassium sulphate, magnesium silicofluoride, magnesium sodium chloride, magnesium sulphate, magnesium thiosulphate. Of particular usefulness in the preparation of a drilling fluid in accordance with the practice of this invention are the readily available magnesium salts, such as magnesium chloride, magnesium sulphate and magnesium lignosulfonate which tends to serve not only as magnesium ion donor but also as a clay dispersing agent, as well as those magnesium compounds such as magnesium ammonium chloride, which upon dissolution in water yield both magnesium ions and ammonium ions.

Water-soluble ammonium salts suitable for use in the preparation of a drilling fluid in accordance with the practice of this invention include the following ammonium salts, ammonium benzoate, ammonium bromide, ammonium chloride, ammonium citrate, ammonium cyanate, ammonium dithionate, ammonium ferrocyanide, ammonium fluoride, ammonium gallate, ammonium hypophosphite, ammonium iodide, ammonium nitrate, ammonium nitrite, ammonium persulphate, ammonium metaphosphate, ammonium acid phosphite, ammonium salicylate, ammonium sulphate, ammonium sulphamate, ammonium sulphite, ammonium tartrate and ammonium thiocyanate.

As indicated hereinabove, in accordance with one feature of this invention there is provided a reagent mixture in liquid form (aqueous solution or slurry) or dry solid form which when added to water which may or may not contain a colloidal hydratable drilling clay, such as a bentonitic type drilling clay, provides the desired alkalinity and/or magnesium ion content in the aqueous filtrate phase. Such a reagent or additive admixture in accordance with this invention would contain a water-soluble magnesium compound, such as a magnesium salt and a water-soluble ammonium compound, such as an ammonium salt or ammonium hydroxide (ammonia). Desirably such a reagent admixture would also contain hydratable magnesium oxide or magnesium hydroxide in addition to the water-soluble magnesium salt and the water-soluble ammonium compound. A suitable reagent admixture might have the following materials in the indicated weight ratio range: water-soluble magnesium salt, hydratable magnesium oxide or magnesium hydroxide and clay dispersing agent, 1:1–10:1–10 respectively, e. g., magnesium sulfate, magnesium hydroxide and magnesium lignosulfonate in the weight ratio 1:3:3. To the admixture there may be added, if desired, an amount of a water-soluble ammonium salt at least equal to the magnesium salt or to the magnesium oxide contained therein, to act as the solubilizing agent for the magnesium hydroxide in the prepared drilling fluid.

Any suitable dispersing agent may be employed in the practice of this invention provided it is compatible with the other components making up the drilling mud, i. e., it is not salted out and does not undergo a chemical reaction or a physical or chemical change which would render it unsuitable or useless as a dispersing agent for the magnesium-base converted drilling clay and provided also it exhibits sufficient dispersing power in the drilling fluid to disperse and stabilize magnesium converted hydrated clay material within the drilling fluid. A satisfactory clay dispersant is a lignosulfonate, such as calcium lignosulfonate, sodium lignosulfonate, magnesium lignosulfonate or ammonium lignosulfonate or mixtures thereof. Another suitable dispersing agent is a commercially available material known in the trade as yellow dextrin which is a water dispersible degradation product of starch. An especially suitable dispersing agent is a predominantly sodium salt of a polymeric polyphenol derivative obtained as an extract of hemlock bark and sold under the trade name "Rayflo" by the Rayonier Company, Inc.

The drilling fluids prepared in accordance with this invention may also include the usual water loss additives, such as prehydrolyzed starch commercially available under the trade name "Impermex" or "Mylogel," or carboxy-methylcellulose (CMC) and the like.

It is pointed out that in an oil-in-water emulsion drilling fluid prepared in accordance with this invention the water loss is low as compared with an oil-free water base mud also prepared in accordance with this invention. Presumably the dispersed emulsified oil phase, usually a diesel oil fraction, decreases or inhibits water loss.

The following tests are illustrative of the practice of this invention and the advantages to be obtained in employing a drilling fluid containing an alkaline aqueous phase saturated with respect to magnesium hydroxide and having a relatively high dissolved magnesium ion content. In carrying out the tests synthetic heaving or sloughing shale samples, obtained by slurrying Rogers Lake clay, filtering the resulting admixture and aging the resulting filter cake, were immersed into 200 cc. portions of an aqueous alkaline solution prepared as described hereinbelow in order to demonstrate the advantages of the practice of this invention. The shale samples were immersed for seven days and after this period their appearance was noted and the samples were qualitatively tested for hardness. The results of these tests are set forth hereinbelow.

| Test No. | Composition of aqueous phase | $P_t$ | $M_t$ | Versenate cc. (Mg. concentration) | Cl conc., p. p. m. | pH | Physical Appearance | Hardness |
|---|---|---|---|---|---|---|---|---|
| 1 | 2 p. p. b. Mg(OH)$_2$ | 0.05 | 0.10 | 0.10 (24 p. p. m.) | 120 | 9.7 | D | −3 |
| 2 | 2 p. p. b. NH$_4$Cl | | | trace | | 5.5 | NC-ND | −1 |
| 3 | 2 p. p. b. MgSO$_4$.7H$_2$O | | | | | 6.9 | C-ND | −1 |
| 4 | {2 p. p. b. Mg(OH)$_2$ / 1 p. p. b. NH$_4$Cl} | 1.25 | 1.45 | 1.58 (380 p. p. m.) | 1,950 | 9.6 | SC-ND | 0 |
| 5 | {2 p. p. b. Mg(OH)$_2$ / 2 p. p. b. NH$_4$Cl} | 2.10 | 2.45 | 2.82 (676 p. p. m.) | 3,900 | 9.5 | SC-ND | 1 |
| 6 | {2 p. p. b. Mg(OH)$_2$ / 10 p. p. b. NH$_4$Cl} | 4.30 | 5.20 | 6.50 (1,560 p. p. m.) | 18,250 | 9.1 | NC-ND | 1 |
| 7 | {2 p. p. b. MgSO$_4$.7H$_2$O / NH$_4$OH to $P_t$=1.0} | 0.90 | 0.98 | 2.20 (529 p. p. m.) | | 9.9 | C-ND | 0 |
| 8 | {2 p. p. b. MgSO$_4$.7H$_2$O / NH$_4$OH to P=3.0} | 2.9 | 3.2 | (>500 p. p. m.) | | 10.0 | C-ND | 1 |

P. p. b.=pounds per barrel (42 gals.).
P. p. m.=parts per million by wt.
$P_t$ is the number of ccs. of N/50 H$_2$SO$_4$ required to titrate 1 cc. to phenolphthalein end point.
$M_t$ is the number of ccs. of N/50 HSO required to titrate 1 cc. to methyl orange end point.
Versenate cc. is the number of ccs. of standard Versenate solution required to titrate 1 cc. of the aqueous phase.
Physical appearance: C—cracked; SC—slightly cracked; VSC—very slightly cracked; SS—slightly smoothed; NC—no cracking; D—dispersed; SD—some dispersion; ND—no dispersion.
Qualitative hardness scale: 2—hardened; 1—slightly hardened; 0—no effect; −1—slightly softened; −2—softened; −3—dispersed.

As indicated by the foregoing test data, see particularly tests 4–8, an alkaline aqueous phase saturated with magnesium hydroxide and having a relatively high dissolved magnesium content effectively stabilizes and hardens a normally dispersing shale. It is this alkaline aqueous phase which is the active and essential component of a drilling mud prepared in accordance with this invention and which imparts the shale stabilizing properties to the drilling mud.

As will be apparent to those skilled in the art many alterations, substitutions and changes may be made in this invention without departing from the spirit or scope thereof.

We claim:
1. A drilling fluid comprising an alkaline aqueous phase which consists essentially of a saturated aqueous magnesium hydroxide solution at least about 400 parts per million by weight magnesium dissolved therein, and a water-soluble ammonium compound as a solubilizing agent for said magnesium hydroxide, said aqueous phase having a pH in the range 8.5–10.5.

2. A drilling fluid in accordance with claim 1 wherein said solubilizing agent is an ammonium salt.

3. A drilling fluid in accordance with claim 1 wherein said solubilizing agent is ammonium chloride.

4. A drilling fluid comprising undissolved magnesium hydroxide and a clayey material dispersed in an alkaline aqueous phase which consists essentially of a saturated aqueous magnesium hydroxide solution, at least about 400 parts per million by weight magnesium dissolved therein, and a water soluble ammonium compound as a solubilizing agent and said magnesium hydroxide, said aqueous phase having a pH in the range of 8.5–10.5.

5. A water base drilling fluid comprising an alkaline aqueous phase, a hydrated drilling clay dispersed in said aqueous phase and a dispersing agent for said clay, said aqueous phase consisting essentially of an aqueous saturated magnesium hydroxide solution and a water-soluble ammonium compound as a solubilizing agent for said magnesium hydroxide dissolved therein, said aqueous phase containing dissolved therein at least 400 parts per million by weight magnesium, said aqueous phase having a pH in the range 8.5–10.5.

6. A fluid in accordance with claim 5 wherein said dispersing agent is calcium lignosulfonate.

7. A fluid in accordance with claim 5 wherein said dispersing agent is ammonium lignosulfonate.

8. In the drilling of a bore hole through a heaving shale formation wherein a drilling fluid is passed through the bore hole in contact with the heaving shale formation during the drilling operation the improvement which comprises contacting said heaving shale formation with a drilling fluid comprising an alkaline aqueous phase consisting essentially of a saturated aqueous magnesium hydroxide solution and having dissolved therein at least about 400 parts per million by weight magnesium, and a water-soluble ammonium compound as a solubilizing agent for said magnesium hydroxide.

9. A water base drilling fluid comprising an alkaline aqueous phase, a drilling clay dispersed in said aqueous phase and a dispersing agent for said clay, said aqueous phase consisting essentially of a saturated aqueous solution of magnesium hydroxide, a water-soluble ammonium compound as a solubilizing agent for said magnesium hydroxide dissolved therein and at least about 400 parts per million by weight dissolved magnesium, said drilling fluid containing dissolved therein an amount of said solubilizing agent at least equal in weight to the dissolved magnesium present in said fluid, said aqueous phase having a pH in the range 8.5–10.5.

10. A drilling mud additive suitable for use in the preparation of an aqueous alkaline drilling mud comprising an admixture consisting essentially of equal amounts by weight of a clay dispersing agent, a water-soluble magnesium compound and aqueous ammonium hydroxide.

11. A drilling mud additive suitable for use in the preparation of an aqueous drilling mud comprising an admixture consisting essentially of a clay dispersing agent, a water-soluble ammonium salt and magnesium hydroxide in the weight ratio 1–10:1–10:1–10.

12. A drilling mud additive suitable for use in the preparation of an aqueous drilling mud comprising an admixture consisting essentially of a clay dispersing agent, a water-soluble ammonium salt, magnesium hydroxide and a water-soluble magnesium compound in the weight ratio 1–10:1–10:1–10:1.

13. A drilling mud additive suitable for use in the preparation of an aqueous drilling mud comprising an admixture consisting essentially of a clay dispersing agent, ammonium hydroxide, magnesium hydroxide and a water soluble magnesium salt in the weight ratio 1–10:1–10:1–10:1.

14. A drilling mud additive suitable for use in a preparation of an aqueous drilling mud comprising an admixture consisting essentially of a water-soluble magnesium salt and magnesium hydroxide, the relative proportions of said magnesium salt and said magnesium hydroxide being in the weight ratio range 1:1–10, respectively.

15. A drilling mud additive suitable for use in the preparation of an aqueous drilling mud consisting essentially of a water-soluble ammonium salt, magnesium hydroxide and a clay dispersing agent in the weight ratio range 1–10:1–10:1–10, respectively.

References Cited in the file of this patent

UNITED STATES PATENTS

| | | |
|---|---|---|
| 2,371,955 | Dawson et al. | Mar. 20, 1945 |
| 2,491,437 | Perkins | Dec. 13, 1949 |
| 2,607,730 | Ragland | Aug. 19, 1952 |
| 2,686,593 | Vogel et al. | Aug. 17, 1954 |
| 2,771,420 | Rowe | Nov. 20, 1956 |
| 2,789,949 | Scotty | Apr. 23, 1957 |

OTHER REFERENCES

Davis: The Swelling of Bentonite and Its Control—article in Ind. and Eng. Chem., vol. 19, No. 12, December 1927, pages 1350, 1351, and 1352.